Dec. 23, 1958

H. M. ST. JOHN, JR
PITCH CONTROL SERVO SYSTEM FOR AN
AERONAUTICAL PROPELLER 2,865,460

Filed June 17, 1954

INVENTOR.
HARRY M. ST. JOHN JR.
BY
Roger B. McCormick
ATTORNEY

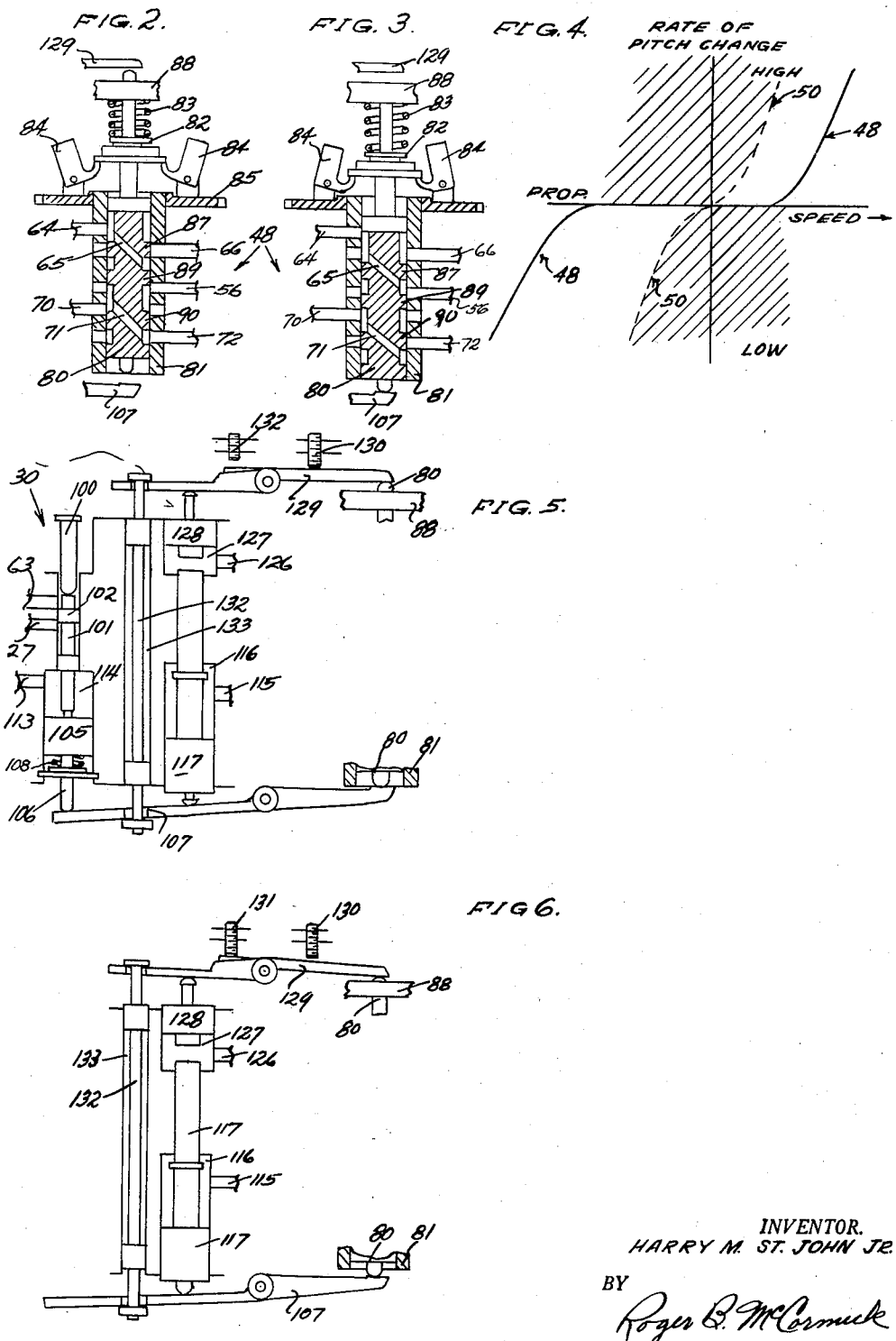

United States Patent Office 2,865,460
Patented Dec. 23, 1958

2,865,460

PITCH CONTROL SERVO SYSTEM FOR AN AERONAUTICAL PROPELLER

Harry M. St. John, Jr., Farmington, Conn., assignor to United Aircraft Corporation, East Hartford, Conn., a corporation of Delaware Application June 17, 1954, Serial No. 437,326

14 Claims. (Cl. 170—160.2)

This invention relates to improvements in aeronautical propellers and, more specifically, to improvements in a servo system for controlling the pitch changing mechanisms of a propeller.

The servo system utilizes hydraulic forces to operate a reversible servo motor which, in selective and controlled movements, controls the pitch changing mechanism. The system may be described generally as comprising a plurality of interconnected valves including two flow control valves for the servo motor and two pressure regulating valves which cooperate with the flow control valves to provide for fluid flow to or from the servo motor to selectively operate the servo motor and effect changes in the pitch angle of the propeller blades. One of the said control valves is electrically operated to exercise flow control to and from the servo motor, in what may be considered normal operation, while the other control valve is inactive and does not exercise flow control to and from the servo motor. However, the said other control valve is mechanically operated to exercise flow control in the event the electrically operated valve becomes inoperative or malfunctions and the said other or mechanically operated control valve will assist the electrically operated control valve in flow control under extraordinary conditions as when a large pitch angle correction is necessitated to correct excessive conditions of propeller overspeeding or underspeeding. The provision of the mechanically operated control valve is an important safety feature in the servo system. In this connection, it should be noted that the mechanically operated control valve is constructed and arranged to render the electrically operated valve incapable of improper operation after the said mechanically operated valve commences flow control operation. It should also be noted that the mechanically operated control valve is utilized to cause feathering and unfeathering of the propeller blades and the electrically operated control valve is utilized to cause reversing of the propeller blades.

The servo system will be described in detail without specific reference to any particular propeller assembly and without reference to any specific pitch changing mechanism. It will be understood that the servo system may be utilized in a variety of propeller assemblies to actuate a variety of pitch changing mechanisms. U. S. Patent No. 2,652,122 to Longfellow may be relied upon for a disclosure of a propeller assembly and pitch changing mechanism which can be operated by the servo control system of this invention.

It is the general object of the invention to provide a more reliable and foolproof hydraulically operated servo system than has heretofore been developed for effecting pitch control in an aeronautical propeller.

A more specific object of the invention is to provide in a servo system of the aforementioned type a pair of flow control valves wherein one of the valves is electrically operated and extremely sensitive and normally controls flow to the exclusion of the other and wherein said other flow control valve is a safety or standby device adapted to assist the said one valve under extraordinary conditions and to take over flow control when the said one valve becomes inoperative or malfunctions while at the same time rendering the said one valve incapable of further malfunction.

Other objects and advantages of the invention will become apparent to those skilled in the art from the following description of the annexed drawings showing a presently preferred embodiment and in which Fig. 1 is a schematic view of the system including the flow control valves and the servo motor and showing the system when no pitch change or correction is being effected;

Fig. 2 is a schematic view of the mechanically operated control valve in operation as a result of propeller overspeeding;

Fig. 3 is a view similar to Fig. 2 but showing the mechanically operated control valve in operation as a result of propeller underspeeding;

Fig. 4 is a graph illustrating the relationship between the two control valves in exercising propeller pitch and speed control;

Fig. 5 shows the mechanically operated control valve operated by the propeller feathering mechanism included in the system; and Fig. 6 shows the mechanically operated control valve as conditioned during propeller reversing.

Figure 1:
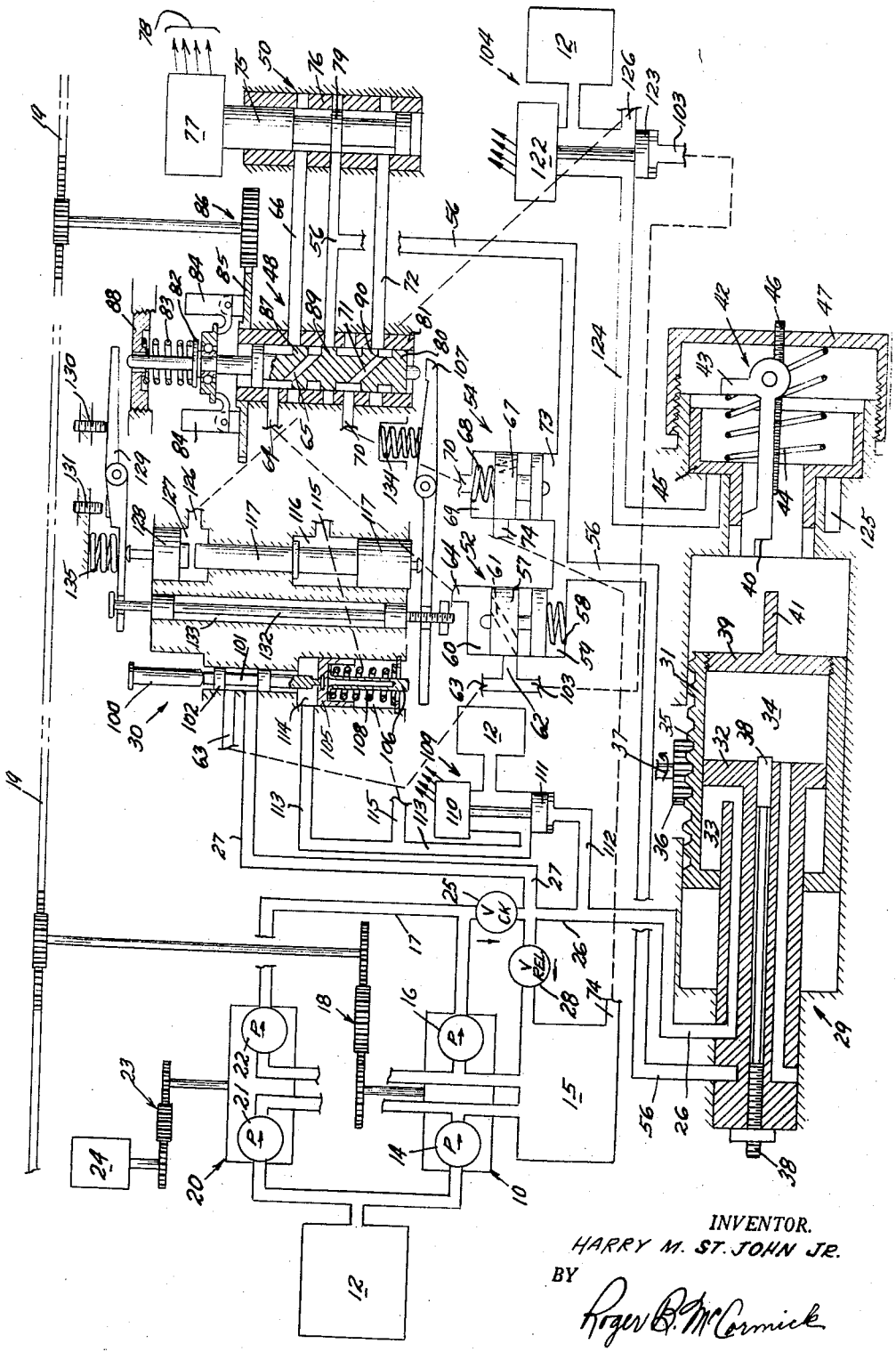

Many of the details of the present servo system are shown and fully described in the application of Stanley G. Best, Serial No. 426,061, filed April 28, 1954, now U. S. Patent No. 2,840,170, to which reference may be had to supplement the following description.

As previously mentioned, the system is adapted to utilize hydraulic fluid for operating a reversible servo motor which controls the propeller pitch changing mechanism. In order that the system may be supplied with hydraulic fluid under pressure, a main pump unit 10 is arranged to withdraw oil or other hydraulic fluid from a sump 12 which is not subjected to pressure other than that of the atmosphere. The pump unit 10 includes one pump 14 for the purpose of withdrawing the oil from the atmospheric sump 12 and discharging the same into a pressurized sump 15 and the unit 10 also includes a pump 16 which withdraws the oil from the pressurized sump 15 and discharges the same into the system through a conduit 17. It is preferred that the aforementioned pumps 14 and 16 be arranged in tandem and connected to a gear train 18 driven by a gear 19 which rotates with the propeller. As shown in the aforementioned Longfellow patent, the drive gear 19 may comprise a large diameter gear forming a part of the hub section of the propeller so as to rotate at equal speed therewith. Accordingly, during normal propeller operation, the pump unit 10 and sumps 12 and 15 provide means for continuously introducing hydraulic fluid under pressure to the control system.

A generally similar tandem pump unit 20, including the pumps 21 and 22, is adapted to supply the system while the propeller is feathered or being feathered or unfeathered and the unit 20 may also be utilized during the periods that the propeller is not rotated within the range of normal operating speeds. More specifically, the pump unit 20 is driven through a gear train 23 by an electric motor 24 which may be manually energized and/or automatically energized.

The hydraulic fluid which is introduced to the system through the conduit 17 passes through a check valve 25 disposed in the conduit 17 to maintain pressure within the system. Having passed the check valve 25, the hydraulic fluid passes into two interconnecting passages or conduits 26 and 27 one of which contains a relief valve 28 connected to the pressurized sump 15 to relieve the system of excess pressure and to maintain the hydraulic fluid within the system at a preselected pressure level. The conduit 26 extends to the servo motor indicated generally by the reference numeral 29 and the conduit 27 extends to a feathering valve indicated generally by the reference numeral 30.

The servo motor 29 may take a variety of known forms, but preferably it includes a movable cylinder 31 and a fixed piston 32. Within the cylinder 31, the piston 32 defines two chambers 33 and 34. As shown in the drawings, hydraulic fluid under pressure within the left-hand chamber 33 tends to move the cylinder 31 toward the left and hydraulic fluid under pressure within the right-hand chamber 34 tends to move the cylinder 31 toward the right. The cylinder 31 is provided with teeth 35 arranged longitudinally of the cylinder and engaging a pinion 36 which drives an output shaft 37 connected (directly or indirectly) to the pitch changing mechanism (not shown). If counterclockwise rotation of the shaft 37, as indicated by the arrow, is assumed to effect a change in the pitch angle of the propeller blades toward low pitch, it will be quite apparent that movement of the cylinder 31 in the right-hand direction corresponds to decreasing the pitch angle and movement of the cylinder 31 in the left-hand direction corresponds to increasing the pitch angle. It will also be apparent that the position of the cylinder 31 relative to the piston 32 accurately reflects the pitch angle of the propeller.

The aforedescribed right-hand and left-hand movement of the servo cylinder 31 is normally effected by the servo system for the purpose of controlling propeller speed. That is, it is the normal purpose of the servo system and the servo motor to effect propeller pitch corrections so that the propeller speed is best suited to the aircraft engine or to the power setting of the engine. The servo system may be used to particular advantage in preventing propeller overspeeding and underspeeding in an installation which includes a constant speed aircraft engine or an engine having a relatively narrow range of operating speeds. If, for some reason, the propeller overspeeds, the system will actuate the servo cylinder so as to increase the propeller pitch and thereby reduce propeller speed to the level of desirable operation. If, for some reason, the propeller underspeeds, the servo system will actuate the servo motor to decrease pitch so as to increase propeller speed to the level of desirable operations.

In the following detailed description of the system and servo motor, it can be assumed that the said system is included in a propeller-engine installation wherein the engine is of the constant speed type having a relatively limited range of operating speeds. In such environment, the extraordinary operation of the servo system will also be described. That is, the operation of the system in feathering the propeller and reversing the pitch of the propeller will also be described.

To permit full feathering of the propeller, it is necessary that the cylinder 31 be capable of movement toward the left to a position corresponding to the fully feathered position of the propeller blades. To this end, the adjustable high pitch stop 38 which extends through the piston 32 is arranged to engage the right-hand end 39 of the cylinder 31 only when the said cylinder has reached a left-hand position corresponding to a feathered position of the propeller.

A low pitch stop 40 is also incorporated in the construction to engage an appendage 41 on the right-hand end 39 of the servo cylinder and limit the low pitch movement of the cylinder and the propeller. The low pitch stop 40 is located on one arm of a bell crank 42 which one arm is arranged to be pivoted out of the way and thus permit movement of the servo cylinder 31 into the reverse pitch range. More specifically, the bell crank 42 has a second arm 43 which is engaged by a spring 44 seated on a piston 45. When the piston 45 is moved toward the right it permits limited clockwise rotation of the bell crank 42 so that the low pitch stop 40 cannot be engaged by the servo cylinder appendage 41. As a result, the servo cylinder can move into the reverse pitch range and reverse the pitch of the propeller blades. A reverse pitch stop screw 46 is threaded into an adjustable and detachable cap 47 to engage the appendage 41 and limit the reverse pitch movement of the servo cylinder 31 and thus place a limit on the reverse pitch angle of the propeller blades. It will be seen that by adjusting the cap 47, the low pitch stop can be adjusted toward or away from the appendage 41.

As previously mentioned, hydraulic fluid under pressure in the left-hand servo chamber 33 tends to cause left-hand or high pitch movement of the servo cylinder 31, and hydraulic fluid under pressure in the servo chamber 34 tends to cause right-hand or low pitch movement of the servo cylinder 31. The servo cylinder is reciprocated by varying the relationship of the fluid pressure in the chamber 33 to the fluid pressure in the chamber 34. It will be readily understood that the relationship between the said fluid pressures can be varied by fluid flow into and out of one or both of the chambers 33 and 34. It has been found most convenient to cause reciprocation of the servo cylinder 31 by fluid flow into and out of only the chamber 34. The cylinder will not move when the fluid pressures in the chambers 33 and 34 are in one predetermined relationship. In the example shown, the left-hand face of the cylinder 31 is approximately half the area of the exposed right-hand face of the cylinder 31. Accordingly, when the fluid pressure in the chamber 34 is approximately half the fluid pressure in the chamber 33, the servo cylinder 31 will not move. As shown in the drawings, the conduit 26 discharges hydraulic fluid at pump pressure to the chamber 33 and, therefore, there will be no servo cylinder movement when the fluid pressure in the chamber 34 is equal approximately to half the pump pressure.

In following the preferred practice of obtaining servo cylinder reciprocation by flow to and from the servo chamber 34, the servo pressure (Ps) in the chamber 34 will vary widely. However, means are provided to assure flow to or from the servo chamber 34 at fixed rates, despite the variation of servo pressure (Ps) in the chamber 34 and despite variations in the imposed load and forces on the servo cylinder 31. The means for selectively fixing the flow rates to or from the servo chamber 34 includes the pair of flow control valves, indicated generally by the reference numerals 48 and 50, which cooperate with a pair of pressure regulating valves 52 and 54. As shown in the drawings, the flow control valves 48 and 50 are both connected to a conduit or flow passage 56 which communicates with the servo chamber 34 and the pressure regulating valves 52 and 54 are connected to the passage 56 to be responsive to servo (Ps) pressure.

With specific reference to the pressure regulating valve 52, it will be noted that the same includes an axially movable valve body member 57 which is biased in one direction by a spring 58. The chamber 59 surrounding the said spring communicates with the servo pressure passage 56 and, accordingly, the fluid pressure within the spring chamber 59 is equal to the pressure (Ps) in the servo chamber 34. The fluid in the chamber 59 exerts pressure against the bottom of the valve member 57 which pressure is supplemented by the force of the spring 58. The fluid pressure and spring force tend to move the valve member 57 upwardly to close a chamber 60 at the top end of the valve member. However, when the valve member 57 is shifted upwardly, a passage 61, extending at an oblique angle through the said valve member and opening into the chamber 60, is brought into communication with a passage 62 which is connected by the conduit 63 through the feathering valve 30 to the conduit 27 which contains hydraulic fluid at pump pressure. For the purpose of fully understanding the operation of the valve 52, it should be explained that pump pressure is considerably greater than servo pressure (Ps) during all of the anticipated operating conditions. It should also be understood that the spring 58 exerts a force on the valve member 57 having a pressure equivalent less than the difference between pump pressure and servo pressure. Therefore, the chamber 60 will become filled with hydraulic fluid which presses the valve member 57 downwardly in opposition to the combined fluid and spring pressure in the spring member 59. When the valve member 57 is thrust downwardly to the position shown, the internal passageway 61 will no longer be connected to the source of hydraulic fluid at pump pressure and pressure in the chamber 60 will equal the servo pressure within the spring chamber 59 plus the pressure equivalent exerted by the spring 58. In other words, the chamber 60 in the valve 52 provides a source of hydraulic fluid at a pressure a fixed amount greater than the servo pressure (Ps) within the servo chamber 34. Assuming the spring 58 to have a pressure equivalent of 30 p. s. i., the high pressure chamber 60 will always have fluid at 30 p. s. i. greater than servo pressure. As shown in the drawings, the high pressure chamber 60 is connected by the passage 64 to the uppermost port of the flow control valve 48. A transverse passage 65 in the valve 48 connects the conduit 64 to the conduit 66 which communicates with the uppermost port in the flow control valve 50.

The pressure regulating valve 54 includes an axially movable valve body 67 which is biased downwardly by a spring 68. The chamber 69 surrounding the spring 68 is connected by a conduit 70 to the lowermost port on the flow control valve 48. An internal passageway 71 in the flow control valve 48 connects the conduit 70 to a conduit 72 which communicates with the lowermost port on the control valve 50. The chamber 73 on the opposite side of the movable valve member 67 is in communication with the conduit 56 containing fluid at servo pressure (Ps). It will be seen that the servo pressure within the chamber 73 must equal the fluid pressure within the spring chamber 69 plus the force of the spring 68 which, for purpose of illustration, may be assumed to exert a force on the valve body 67 equivalent to 30 p. s. i. of fluid pressure. If the servo pressure in the chamber 73 is less than the combined fluid and spring pressure in the chamber 69, the valve member 67 will be thrust downwardly to expose a drain passage 74 which extends to the pressurized sump 15 wherein the hydraulic fluid is contained at considerably less than any anticipated servo pressure. Thus, the fluid pressure within the spring chamber 69 will be reduced until it reaches a level 30 p. s. i. less than the servo pressure in the chamber 73. When the fluid pressure in the chamber 69 reaches the said level (Ps −30) the valve 67 will be balanced in the position shown to close the drain passage 74. Accordingly, the chamber 69 in the pressure regulating valve 54 provides a source of hydraulic pressure a fixed amount less than the servo pressure in the valve chamber 73 and in the servo chamber 34.

The aforedescribed pressure regulating valves 52 and 54 are cooperatively associated with the flow control valves 48 and 50 which function to selectively connect fluid from the said pressure regulating valves to the servo cylinder chamber 34. Each of the flow control valves 48 and 50 includes an axially movable valve member which is subjected to movement in response to propeller speed changes. The valve 48, which may properly be referred to as a "safety" flow control valve, is mechanically operated by centrifugal forces and is sensitive to propeller speed changes, but comes into operation only under extraordinary conditions as when there is an excessive amount of propeller underspeeding or overspeeding. Under such conditions, the valve 48 assists the valve 50 in flow control. If the valve 50 becomes inoperative, the valve 48 exercises flow control independently of the valve 50 and renders the valve 50 incapable of malfunction. However, during ordinary or normal operation, the valve 48 remains in the position shown in Fig. 1 wherein communication is effected from the valves 52 and 54 through the valve 48 to the uppermost and lowermost ports, respectively, of the valve 50. The flow control valve 50 will now be described.

The flow control valve 50 may properly be referred to as a "proportional solenoid operated flow control valve" and functions to selectively control flow between the servo chamber 34 and the high pressure regulating valve 52 and the low pressure regulating valve 54. It will be seen that the movable valve member 75 included in the flow control valve 50 is arranged for movement within a sleeve 76 and projects thereabove. The projecting portion of the movable member 75 comprises the armature of a proportional solenoid 77 which may include one or more coils connected by the lines 78 to an electronic governor (not shown). The said electronic governor is adapted to operate the valve 50 to provide propeller response to satisfy engine operating requirements under all conditions. The electronic governor is very sensitive to propeller speed variations. When the electronic governor is excited, it generates and transmits a signal to the solenoid 77 and energizes the said solenoid to move the valve member 75 upwardly or downwardly. In the specific example shown, if a propeller overspeeding condition arises, the electronic governor energizes the solenoid 77 to raise the valve member 75 which, as will be shown, results in flow from the servo chamber 34 to increase propeller pitch. If a propeller underspeeding condition arises, the electronic governor will energize proportional solenoid 77 to lower the valve member 75 which, as will be shown, causes flow into the servo chamber 34 to effect movement toward low pitch.

More specifically, a land 79 is provided on the movable valve member 75 to close and selectively open the intermediate valve port which is connected to the conduit 56 extending to the servo chamber 34. The land 79 normally closes the passage 56, as when no correcting signal is transmitted by the electronic governor. When the valve member 75 is thrust downwardly by the solenoid, as will occur upon a signal transmitted as a result of underspeeding, the passage 56 is opened for the flow of fluid from the high pressure regulating valve 52 through the valve 48 and conduit 66. The flow through the passage 56 goes into the servo chamber 34, resulting in a servo cylinder shift toward the right to lower propeller pitch and increase propeller speed. When the valve member 76 is elevated by the solenoid in response to propeller overspeeding, the passage 56 will be opened to drain fluid from the servo chamber 34 into the passage 72 and through the valve 48 to the low pressure regulating valve 54.

It is important to observe that the flow of fluid into the servo chamber 34 increases the servo pressure therein. The new or increased servo pressure is reflected in the pressure in the spring chamber 59 of the high pressure regulating valve 52. As previously described, an increase in pressure in the said spring chamber opens the valve 52 to the flow of fluid at pump pressure until the pressure in the valve chamber 60 is 30 p. s. i. in excess of the pressure in the spring chamber 59. Accordingly, as the servo pressure in the chamber 34 increases, the pressure in the valve chamber 60 and conduit 66 increases a corresponding amount and the pressure drop in the control valve 50 from the passage 66 to the passage 56 will always be constant at 30 p. s. i. As a result, the flow rate to the servo chamber 34 will not vary with pressure increase in the chamber 34 and the rate will be fixed by the opening afforded in the flow control valve 50, said opening being determined by the amount of movement of valve member 75 as is controlled by the proportional solenoid and the intensity of the signal it receives.

Flow from the servo chamber 34 through the flow control valve 50 will decrease the servo pressure (Ps) in the chamber 34 which decreased pressure is reflected in the chamber 73 of the low pressure regulating valve 54. As previously described, a decrease in pressure in the chamber 73 opens the valve 54 to drain until the pressure in the spring chamber 69 and in the passage 72 is 30 p. s. i. below the servo pressure (Ps) in the servo chamber 34. Accordingly, as the servo pressure in the chamber 34 decreases, the pressure in the conduit 72 decreases a corresponding amount and the pressure drop in the flow control valve 50 from the passage 56 to the passage 72 will always be 30 p. s. i. As a result, the flow rate from the servo chamber 34 will not vary with a decrease in pressure within the chamber 34 and the rate will be fixed by the valve 50 as controlled by the proportional solenoid 77 and the electronic governor.

The mechanically operated flow control valve 48 has hereinbefore been referred to as a safety valve which under normal or ordinary conditions does not operate to exercise flow control to or from the servo motor. It has been explained that normally the valve 48 is utilized to connect the electrically operated valve 50 to the pressure regulating valves 52 and 54, respectively. Flow from the valve 52 to the valve 50 is brought about to effect low pitch movement of the propeller blades to correct propeller underspeeding and flow from the valve 50 to the valve 54 is brought about to effect high pitch movement of the propeller blades to correct propeller overspeeding. It has also been mentioned that the valve 48 will assist the valve 50 in flow control to correct excessive overspeeding and underspeeding. That is, when an excessive overspeeding condition arises, the valve 48 will be operated to effect a direct connection from the servo chamber 34 to the valve 54 while at the same time maintaining flow through the valve 50 to the valve 54. When an excessive underspeeding condition arises, the valve 48 will effect a direct connection from the valve 52 to the servo chamber 34 while at the same time maintaining flow through the valve 50 from the valve 52 to the chamber 34. It will be readily understood that the valve 48 will serve independently to regulate flow to and from the servo chamber 34 in the event the electrically operated flow control valve becomes inoperative. However, when the valve 48 operates independently, the servo system is less sensitive to propeller speed variations in correcting propeller underspeeding and overspeeding conditions. In the detailed description of the valve 48 which follows, it will be pointed out that it is an important feature of the valve 48 that it is constructed and arranged to prevent the effects of improper operation of the valve 50 during the time that the valve 48 is operated. That is, when the valve 48 is operated to cause flow from the high pressure regulating valve 52 to the servo chamber 34, the said valve 48 prevents flow of fluid from the valve 50 to the low pressure regulating valve 54 and when the valve 48 operates to control flow from the servo chamber 34 to the low pressure regulating valve 54, the said valve 48 prevents flow from the high pressure regulating valve 52 to the valve 50.

With more specific reference to the drawings, it will be noted that the flow control valve 48 includes an axially movable body member 80 which is arranged for movement within a sleeve 81 and projects thereabove. A spring seat 82 is secured to the projecting portion of the movable member 80 and seats a spring 83 having an effective force which can be adjusted by means of the opposed adjustable spring seat 88. The spring 83, which will hereinafter be referred to as a speeder spring, urges the body member 80 downwardly. The spring force is opposed by flyweights 84, 84 having radially inwardly extending legs exerting force against the bottom of the spring seat 82 and which flyweights are pivotally mounted on a gear 85 for rotation therewith. The gear 85 is rotated by a gear train 86 driven by the large diameter gear 19. As previously mentioned, the drive gear 19 rotates with the propeller and, accordingly, the gear 85 and flyweights 84, 84 are propeller driven. The said flyweights are arranged to be thrown radially outwardly as a result of centrifugal force responsive to propeller rotation and in pivoting radially outwardly, the flyweights force the spring seat 82 and movable valve member 80 upwardly. Accordingly, the flyweights overbalance the speeder spring and shift the valve member 80 upwardly in response to a propeller overspeeding condition and the speeder spring 83 forces the valve member 80 downwardly as a result of propeller underspeeding.

The valve member 80 has three lands 87, 89 and 90 in spaced apart top-to-bottom order. As shown in Fig. 1, illustrating the normal condition when the valve 48 is not operated, the intermediate land 89 closes the valve port communicating with the conduit 56 which extends to the servo chamber 34. Under such normal condition, the uppermost land 87 does not close the port communicating with the conduit 66 extending to the solenoid operated valve 50 and, as a result, flow is normally accommodated from the high pressure regulating valve 52 to the solenoid operated flow control valve 50. The lowermost land 90 under the normal condition does not close the port communicating with the conduit 72 extending to the solenoid operated valve 50 and, as a result, flow is accommodated from the solenoid operated valve 50 through the internal valve passage 71 to the low pressure regulating valve 54.

When the valve member 80 is thrust upwardly by the flyweights as a result of propeller overspeeding as shown in Fig. 2, the uppermost land 87 will close the port communicating with the conduit 66 to cut off flow to the solenoid operated valve 50, thereby preventing flow from the high pressure regulating valve 52 through the solenoid operated valve 50 to the servo chamber 34. At the same time, upward movement of the land 89 opens the port to the conduit 56 for flow therefrom into the conduit 70 extending to the low pressure regulating valve 54, thereby draining the servo chamber 34 to permit high pitch movement of the servo cylinder 31. Additional drain flow from the servo chamber 34 is accommodated through the solenoid valve 50, if the said solenoid valve is operating properly, and through the conduit 72 and the internal passage 71 to the conduit 70 and the low pressure regulating valve 54. It will be seen that in the overspeeding (Fig. 2) position of the valve member 80 high pressure flow to the solenoid valve 50 is stopped by the valve land 87 so that, in the event the solenoid valve 50 tends to operate improperly, it cannot effect a pitch change in the wrong direction, that is, towards low pitch.

When the valve member 80 is thrust downwardly by the speeder spring 83 as a result of propeller underspeeding as shown in Fig. 3, the lowermost land 90 closes the valve port communicating with the conduit 72 thereby preventing drain flow from the solenoid operated valve 50 to the low pressure regulating valve 54 through the internal passage 71 in the valve 48. At the same time, the intermediate valve land 89 opens the valve port in communication with the conduit 56 to the flow of high pressure fluid from the regulating valve 52 through the internal passage 65 to increase the pressure in the servo chamber 34 and effect low pitch movement of the servo cylinder 31. The uppermost valve land 87 in the underspeeding condition further opens the valve port in communication with the conduit 66 extending to the proportional solenoid valve 50 so that high pressure flow to the servo chamber 34 will also be effected through the said solenoid operated valve. It will be seen that in the underspeeding condition the valve 48 offers direct communication for flow to the servo chamber 34 and at the same time prevents drain flow through the solenoid operated valve 50 which might occur if the solenoid valve 50 operated improperly.

In summary then, it can be said that the mechanically operated flow control valve 48 will master the solenoid operated flow control valve 50 and effect flow control in the event the said valve 50 becomes inoperative and the valve 48 will also exercise flow control and prevent ill effects of malfunction in the event the solenoid operated valve operates improperly.

It can also be said that the valve 48 assists the valve 50 in flow control operation under conditions of excessive propeller overspeeding or underspeeding. This last mentioned feature of the valve 48 can best be understood by reference to Fig. 4 wherein rate of pitch change is set off graphically against propeller speed. The broken line curve is illustrative of the operation of the valve 50 in effecting pitch change. It will be noted that pitch change is effected where the said broken line intersects the horizontal line representing propeller speed. This graphically represents that the solenoid operated flow control valve is extremely sensitive to propeller speed changes toward the right or left of the vertical line. The full line curve illustrates the operation of the mechanically operated flow control valve 48 and shows that the said mechanically operated valve does not effect a change in pitch over a relatively wide band of propeller operating speeds. The shaded portions on the graph show the band of propeller operating speeds wherein the mechanically operated valve renders the solenoid operated valve incapable of improper pitch control. It will be apparent also from the graph that the mechanically operated valve assists the solenoid operated valve in flow control when an overspeeding or underspeeding condition reaches a predetermined excess.

As previously mentioned, the servo system is utilized to effect the extraordinary pitch changes which occur in feathering and reversing the pitch of the propeller blades. In feathering and unfeathering the blades, the mechanically operated valve 48 is utilized to exercise flow control from and to the servo motor 29. However, in such operation of the valve 48, it is not responsive to propeller speed variations but is actuated by other means. In feathering the valve, the said other actuating means shift the valve member 80 upwardly similarly to a propeller overspeeding condition.

In accordance with the present invention, propeller feathering can be either mechanically actuated (manually or automatically) or hydraulically actuated by means of a solenoid operated valve. In either event, the feathering valve 30 is positioned to elevate the movable valve member 80 in the flow control valve 48. In mechanical actuation, a plunger 100 is thrust against the top of an axially movable valve member 101 in the feathering valve 30. In so doing, a land 102 on the member 101 closes communication between the conduit 63 and the conduit 27 which contains hydraulic fluid at pump pressure. As previously mentioned, the conduit 63 communicates with the high pressure regulating valve 52 and when flow through the conduit 63 is shut off, the said high pressure regulating valve 52 can no longer provide a source of high pressure fluid such as will cause low pitch movement of the servo cylinder. The conduit 63 also communicates with a conduit or passage 103 which is connected to a solenoid operated reversing valve indicated generally by reference numeral 104. When flow in the passage or conduits 63 and 103 is discontinued there is not available to the reversing valve 104 a source of hydraulic fluid for pivoting the low pitch stop 40 out of position. Thus, when the movable valve member 101 is thrust downwardly, the servo system is conditioned to prevent low pitch movement of the servo cylinder 31 and as an additional safety feature, the low pitch stop cannot be pivoted from its stop position.

A piston 105 and plunger 106 are connected to the bottom end of the movable member 101, the plunger 106 being arranged to engage one end of a lever 107 to pivot the same counterclockwise. When pivoted counterclockwise, the lever 107 will engage the bottom of the movable member 80 in the pilot valve 48 and thrust the said movable member upwardly to the position shown in Fig. 5. As previously described, when the valve member 80 is thrust upwardly, similarly to its movement resulting from propeller overspeeding, the servo chamber 34 is drained through the valve 48.

As the pitch angle of the blades is increased during feathering, the propeller speed will decrease and finally the propeller stops rotation. When propeller speed is materially reduced the auxiliary motor 24 is energized to operate the auxiliary pump unit 20 to supply the servo system with hydraulic fluid under pressure. Otherwise, the main pump unit 10 would fail to supply the system with hydraulic fluid at sufficient pressure to actuate the servo motor. After the propeller has been fully feathered, the auxiliary motor is de-energized.

When it is desired to unfeather the propeller, the plunger 100 is released and the movable valve member 101 will be thrust upwardly by the force of a spring 108 which engages the piston 105 in the feathering valve 30. When the member 101 is thrust upwardly by the spring 108, the speeder spring 83 can then force the valve member 80 in the mechanically operated valve 48 downwardly similar to a propeller underspeeding condition. However, such movement of the valve member 80 will be of no effect until the servo system is supplied with hydraulic fluid at pump pressure. Therefore, in unfeathering it is necessary to energize the auxiliary motor 24 to pump hydraulic fluid which passes through the control valve 48 into the servo chamber 34 to bring about low pitch movement of the blades. Then, the valves 48 and 50 resume control of the servo motor and propeller pitch.

In hydraulic actuation of the feathering valve 30, a solenoid operated valve 109 is utilized. The valve 109 includes a solenoid 110 which is connected by the lead lines shown to the aircraft electrical system to be selectively energized and de-energized by the aircraft pilot and which, when energized, will elevate a valve plug 111 to interconnect a conduit 112 and a conduit 113. The conduit 112 communicates with the conduit 26 containing hydraulic fluid at pump pressure. The conduit 113 at one end is in communication with a chamber 114 containing the piston 105 and at the other end communicates with the atmospheric sump 12 through the valve 109. Accordingly, the fluid normally in the conduit 113, is at atmospheric pressure. Another conduit 115 extends between the conduit 113 and a chamber 116 containing a lever-actuating piston 117. When the solenoid 110 is energized to cause propeller feathering, the valve plug 111 closes the atmospheric sump 12 and causes hydraulic fluid at pump pressure to flow in the passages 113 and 115 into the chambers 114 and 116, respectively. Hydraulic fluid at pump pressure in the chamber 114 thrusts the piston 105 downwardly and thereby shifts the movable valve member 101 in the feathering valve 30 downwardly to the position shown in Fig. 5. At the same time, hydraulic fluid at pump pressure in the chamber 116 moves the piston 117 downwardly therein, the said piston engaging the lever 107 and assisting in counterclockwise movement thereof. As previously mentioned, counterclockwise movement of the lever 107 elevates the valve member 80 in the flow control valve 48 thereby causing high pitch movement of the servo cylinder 31 to effect feathering of the propeller.

From the foregoing description it should be understood that the feathering valve 30 can be either mechanically or hydraulically actuated to feather the propeller. If hydraulically actuated by the solenoid operated valve 109, the electrical system for energizing the said valve can also include means for energizing the proportional solenoid 77 to elevate the movable valve member 75 in the flow control valve 50. Thus, the valve 50 also comes into play to assist the valve 48 in the feathering operation. It should be understood also that means can be provided for energizing the proportional solenoid 77 similar to a propeller overspeeding condition when the feathering valve 30 is mechanically actuated by thrusting the plunger 100.

The propeller is unfeathered after hydraulic actuation and after the valve 109 has been de-energized, in the same manner that the propeller is unfeathered after manual actuation.

In reversing the pitch of the propeller blades, a solenoid operated reversing valve 104 is energized. The said valve includes a solenoid 122 which is connected by the lead lines shown to the aircraft electrical system to be selectively energized and de-energized by the aircraft pilot and which, when energized, will elevate a valve plug 123 normally closing the conduit 103 containing hydraulic fluid at pump pressure. In elevating the plug 123 communication is effected between the conduit 103 and a conduit or passageway 124 which communicates with an annular chamber 125 surrounding the piston 45 which is utilized to pivot the low pitch stop bell crank 42. The conduit 124 is normally in communication with atmospheric sump 12 through the reversing valve 104. However, when the valve 104 is energized, the atmospheric sump 12 is closed to the conduit 124 and hydraulic fluid at pump pressure is exerted against the piston 45 to pivot the low pitch stop 40 out of the stop position in the manner previously described. The reversing valve 104 when energized also connects the conduit 103 with a conduit or passageway 126 which extends to a chamber 127 containing a piston 128 and also containing an upward extension on the piston 117. When hydraulic fluid at pump pressure is introduced to the chamber 127, the piston 128 is thrust upwardly and engages and pivots a lever 129 clockwise and the piston 117 is thrust downwardly to pivot the lever 107 counterclockwise. The levers 129 and 107 engage the top and bottom ends of the movable member 80 in the valve 48 to hold the said valve member in centered position corresponding to a propeller "on-speed" operating condition. Thus, when the reversing solenoid 104 is energized, the movable valve member 80 in flow control valve 48 is rendered incapable of operating movement so that the said valve will not tend to correct for propeller speed variations while the propeller blades are in reverse pitch.

In the electrical system to the reversing solenoid operated valve 104, there is included means for energizing the proportional solenoid 77 in the control valve 50 similarly to a propeller underspeeding condition so that the movable valve member 75 in the valve 50 is thrust downwardly to cause flow into the servo chamber 34 whereupon the servo cylinder is moved into the reverse pitch range.

In un-reversing or turning back to the positive range of pitch angles, the solenoid operated reversing valve 104 remains energized to incapacitate the flow control valve 48, but the solenoid operated flow control valve 50 receives a signal corresponding to the signal it receives in response to a propeller overspeeding condition. Thus, the flow control valve 50 will effect a change in the pitch angle toward the high pitch direction until the positive range of pitch angles is attained. Then, the reversing valve 104 may be de-energized to release the mechanically operated flow control valve 48 for its normal operation in cooperation with the valve 50.

It is to be noted that the bottom lever 107 and top lever 129 do not engage the movable valve member 80 in the valve 48 except when the system is conditioned for feathering and reversing. As previously described, the lowermost lever 107 engages the member 80 and thrusts it upwardly during feathering. The upward movement of the member 80 is limited by an adjustable stop screw 130 engageable with the top lever 129 to prevent counterclockwise movement thereof. When the valve member 80 engages the lever 129 tending to pivot it counterclockwise, further upward movement of the valve member 80 is prevented.

When the system is conditioned for reversing, the bottom and top levers 107 and 129 both engage the movable valve member 80 as described to prevent axial movement thereof. The member 80 is retained in what may be referred to as a "centered" position. To assist the levers 107 and 129 in centering the member 80, an adjustable screw stop 131 is arranged to engage and limit the clockwise movement of the top lever 129 in such a position that the said lever engages the member 80 when it is centered. A centering rod 132 of adjustable effective length is slidably mounted within a bore 133 to extend between the levers 107 and 129 and to limit the counterclockwise movement of the lever 107 after the top lever 129 has engaged the feathering stop 130 in the feathering operation or after the lever 129 has engaged the centering stop 132 in the reversing operation. When the forces exerted upon the levers 107 and 129 in the feathering or reversing operation have been removed, the said levers are spring biased to positions out of engagement with the movable valve member 80. The spring 134 engages the bottom lever 107 and pivots it clockwise and the spring 135 engages the top lever 129 and pivots it counterclockwise.

While the invention has been described herein with specific reference to one exemplary embodiment, it should be understood that an apparently wide variety of modifications may be effected within the scope of the invention. Accordingly, it is not the intent to limit the scope of the specific example shown and described otherwise than indicated by the claims which follow.

I claim as my invention:

1. In an hydraulically operated servo system which includes a source of hydraulic fluid under pressure and a drain and which also includes a reversible servo motor adapted for operation in one direction by being connected with the said source and for operation in the opposite direction by being connected with the said drain, the combination comprising a first control valve connected directly to the servomotor and having a pressure portion and a drain portion, a first means for moving said first control valve to selectively connect its pressure portion or its drain portion to the said servomotor, a second control valve connected directly to the said servomotor and having a pressure portion connected between the said source and the pressure portion of said first control valve and also having a drain portion connected between the said drain and the drain portion of said first control valve, and second means for moving said second control valve to selectively connect its pressure portion or its drain portion to the said servomotor.

2. In an hydraulically operated servo system which includes a source of hydraulic fluid under pressure and a drain and which also includes a reversible servomotor adapted for operation in one direction by being connected with the said source and for operation in the opposite direction by being connected with the said drain, the combination comprising a first control valve connected directly to the servo motor and having a pressure portion and a drain portion, a first means for moving said first control valve to selectively connect its pressure portion or its drain portion to the said servomotor, a second control valve connected directly to the said servomotor and having a pressure portion connected between the said source and the pressure portion of said first control valve and also having a drain portion connected between the said drain and the drain portion of said first control valve, said second control valve being adapted in one position to connect its pressure portion to the servo motor and to disconnect its drain portion and the drain portion of the first control valve and being adapted in another position to connect its drain portion and the servomotor and to disconnect its pressure portion and the pressure portion of the first control valve, and second means for selectively moving the said second control valve to its said one position or to its said other position.

3. In an hydraulically operated servo system, the combination which includes a reversible servomotor having a working chamber, valve means connected with the working chamber and connectible with a pressurized supply of hydraulic fluid and adapted to utilize the pressure in said chamber as a reference to establish a source of hydraulic fluid at a pressure a predetermined amount above said reference pressure, valve means connected with the working chamber and connectible with a drain and adapted to utilize said reference pressure to establish a drain pressure a predetermined amount below said reference pressure, the said servomotor being adapted for operation in one direction when said chamber is connected with said source and for operation in the opposite direction when said chamber is connected with said drain, a first control valve connected directly to the said chamber and having a pressure passage and a drain passage, a first means for moving said first control valve to selectively connect its pressure passage or its drain passage to said chamber, a second control valve connected directly to said chamber and having a pressure passage connected between said source and the pressure passage of said first control valve and also having a drain passage connected between said drain and the drain passage of said first control valve, and second means for moving said second control valve to selectively connect its pressure passage or its drain passage to said chamber.

4. In an hydraulically operated servo system, the combination which includes a reversible servomotor having a working chamber, valve means connected with the working chamber and connectible with a pressurized supply of hydraulic fluid and adapted to utilize the pressure in said chamber as a reference to establish a source of hydraulic fluid at a pressure a predetermined amount above said reference pressure, valve means connected with the working chamber and connectible with a drain and adapted to utilize said reference pressure to establish a drain pressure a predetermined amount below said reference pressure, the said servomotor being adapted for operation in one direction when said chamber is connected with said source and for operation in the opposite direction when said chamber is connected with said drain, a first control valve connected directly to the said chamber and having a pressure passage and a drain passage, a first means for moving said first control valve to selectively connect its pressure passage or its drain passage to said chamber, a second control valve connected directly to said chamber and having a pressure passage connected between said source and the pressure passage of said first control valve and also having a drain passage connected between said drain and the drain passage of said first control valve, said second control valve being adapted in one position to connect its pressure passage to said chamber and to disconnect its drain passage and the drain passage in the first control valve and being adapted in another position to connect its drain passage to said chamber and to disconnect its pressure passage and the pressure passage in the first control valve, and second means for selectively moving said second control valve to its said one position or to its said other position.

5. In an hydraulically operated servo system which includes a source of hydraulic fluid under pressure and a drain and which also includes a reversible servomotor adapted for operation in one direction by being connected with the source and for operation in the opposite direction by being connected with the said drain, the combination comprising an electrically operated control valve connected directly to the servomotor and having a pressure passage and a drain passage, said control valve being adapted for selective movement into one position connecting its pressure passage to the servomotor or into another position connecting its drain passage to the servomotor, and a mechanically operated control valve connected directly to the servomotor and having a pressure passage connected between the source and the pressure passage of the electrically operated valve and also having a drain passage connected between the drain and the drain passage of the electrically operated valve, said mechanically operated valve being adapted for selective movement into one position connecting its pressure passage to the servomotor and disconnecting its drain passage and the drain passage of the electrically operated valve or into another position connecting its drain passage to the servomotor and disconnecting its pressure passage and the pressure passage of the electrically operated valve.

6. In an hydraulically operated servo system which includes a source of hydraulic fluid under pressure and a drain and which also includes a reversible servo motor adapted for operation in one direction by being connected with the source and for operation in the opposite direction by being connected with the said drain, the combination comprising an electrically operated control valve connected directly to the servo motor and having a pressure passage and a drain passage, said control valve being adapted for selective movement into one position connecting its pressure passage to the servo motor or into another position connecting its drain passage to the servo motor, and a mechanically operated control valve connected directly to the servo motor and having a pressure passage connected between the source and the pressure passage of the electrically operated valve and also having a drain passage connected between the drain and the drain passage of the electrically operated valve, said mechanically operated valve being adapted for selective movement into one position connecting its pressure passage to the servo motor and disconnecting its drain passage and the drain passage of the electrically operated valve while at the same time maintaining connection between its pressure passage and the pressure passage of the electrically operated valve, and said mechanically operated valve also being adapted for selective movement into another position connecting its drain passage to the servo motor and disconnecting its pressure passage and the pressure passage of the electrically operated valve while at the same time maintaining connection between its drain passage and the drain passage of the electrically operated valve.

7. An hydraulic servo system for controlling the pitch of an aeronautical propeller comprising in combination, a source of hydraulic fluid under pressure, a drain, a reversible servo motor adapted to effect pitch change in one direction by being connected with said source and to effect pitch change in the opposite direction by being connected with said drain, a first control valve connected to said servo motor and having a pressure passage and a drain passage, said first control valve being responsive to propeller speed for movement and at one propeller speed will be positioned to connect its pressure passage to said servo motor and at another propeller speed be positioned to connect its drain passage to said servo motor, the said one and another propeller speeds encompassing a relatively narrow range, and a second control valve connected to said servo motor and having a pressure passage connected between said source and the pressure passage of the first control valve and also having a drain passage connected between said drain and the drain passage of said first control valve, said second control valve being responsive to propeller speed for movement and at one propeller speed will be positioned to connect its pressure passage to the servo motor and at another propeller speed to connect its drain passage to the servo motor, the last mentioned one and another propeller speeds encompassing a relatively wide range which includes said relatively narrow range of propeller speeds.

8. An hydraulic servo system for controlling the pitch of an aeronautical propeller comprising in combination, a source of hydraulic fluid under pressure, a drain, a reversible servo motor adapted to effect pitch change in one direction by being connected with said source and to effect pitch change in the opposite direction by being connected with said drain, a first control valve connected to said servo motor and having a pressure passage and a drain passage, said first control valve being responsive to propeller speed for movement and at one propeller speed will be positioned to connect its pressure passage to said servo motor and at another propellor speed be positioned to connect its drain passage to said servo motor, the said one and another propeller speeds encompassing a relatively narrow range, and a second control valve connected directly to said servo motor and having a pressure passage connected between said source and the pressure passage of the first control valve and also having a drain passage connected between said drain and the drain passage of said first control valve, said second control valve being responsive to propeller speed for movement and at one propeller speed will be positioned to connect its pressure passage to the servo motor and to disconnect its drain passage and the drain passage of said first control valve and at another propeller speed to connect its drain passage to the servo motor and to disconnect its pressure passage and the pressure passage in said first control valve, the last mentioned one and another propeller speeds encompassing a relatively wide range which includes said relatively narrow range of propeller speeds.

9. An hydraulic servo system for controlling the pitch of an aeronautical propeller comprising in combination a source of hydraulic fluid under pressure, a drain, a reversible servo motor adapted to effect pitch change in one direction by being connected with said source and to effect pitch change in the opposite direction by being connected with said drain, a first control valve connected directly to said servo motor and having a pressure passage and a drain passage, said first control valve being responsive to propeller speed for movement and at one propeller speed will be positioned to connect its pressure passage to said servo motor and at another propeller speed will be positioned to connect its drain passage to said servo motor, the said one and another propeller speeds encompassing a relatively narrow range, and a second control valve connected directly to said servo motor and having a pressure passage connected between said source and the pressure passage of said first control valve and also having a drain passage connected between said drain and the drain passage of said first control valve, said second control valve being responsive to propeller speed for movement and at one propeller speed will be positioned to connect its pressure passage to the servo motor and to disconnect its drain passage from the drain passage of said first control valve while maintaining connection between its pressure passage and the pressure passage of said first control valve and at another propeller speed to connect its drain passage to said servo motor and to disconnect its pressure passage from the pressure passage of said first control valve while at the same time maintaining connection between its drain passage and the drain passage of said first control valve, the last mentioned one and another propeller speeds encompassing a relatively wide range which includes said relatively narrow range of propeller speeds.

10. An hydraulic servo system for controlling the pitch of an aeronautical propeller comprising in combination, a source of hydraulic fluid under pressure, a drain, a reversible servo motor adapted to effect pitch change in one direction by being connected with said source and to effect pitch change in the opposite direction by being connected with said drain, an electrically operated control valve responsive to propeller speed and connected directly to said servomotor and having a pressure passage and a drain passage, said control valve being positioned at one propeller speed to connect its pressure passage to said servomotor and at another propeller speed to connect its drain passage to said servomotor, the said one and another propeller speeds encompassing a relatively narrow range, and a mechanically operated control valve responsive to propeller speeds and connected directly to said servomotor and having a pressure passage connected between said source and the pressure passage of the electrically operated control valve and also having a drain passage connected between said drain and the drain passage of said electrically operated control valve, said mechanically operated control valve at one propeller speed being positioned to connect its pressure passage to the servomotor and to disconnect its drain passage from the drain passage of the electrically operated control valve while maintaining connection between its pressure passage and the pressure passage of the electrically operated control valve and at another propeller speed being positioned to conenct its drain passage to the servomotor and to disconnect its pressure passage from the pressure passage of said electrically operated control valve while maintaining connection between its drain passage and the drain passage of said electrically operated control valve, the last mentioned one and another propeller speeds encompassing a relatively wide range which includes said relatively narrow range of propeller speeds.

11. An hydraulic servo system for controlling the pitch of an aeronautical propeller comprising in combination, a source of hydraulic pressure, a drain, a reversible servomotor adapted to effect pitch change toward low pitch when connected with the source and toward high pitch when connected with the drain, a movable control valve responsive to propeller speed connected to the servomotor and having a pressure passage connected to the source and a drain passage connected to the drain, said control valve being positioned at one propeller speed to connect its pressure passage to the servomotor and being positioned at a greater propeller speed to connect its drain passage to the servomotor, and means for feathering the propeller including selectively operable actuating means engageable with said control valve to shift to and maintain the same in its position corresponding to said greater propeller speed, said actuating means including a valve adapted to disconnect said source and said control valve when said control valve is engaged by said actuating means.

12. An hydraulic servo system for controlling the pitch of an aeronautical propeller comprising in combination, a source of hydraulic pressure, a drain, a reversible servomotor adapted to effect pitch change toward low pitch when connected with the source and toward high pitch when connected with the drain, a first control valve connected to the servomotor and having a pressure passage and a drain passage and being responsive to propeller speed to selectively connect its pressure passage or its drain passage to the servomotor, a second control valve connected to the servomotor and having a pressure passage connected between the source and the pressure passage in the first control valve and a drain passage connected between the drain and the drain passage of the first control valve, said second control valve being responsive to propeller speed to selectively connect its pressure passage to the servomotor and to disconnect its drain passage from the drain passage of the first control valve or to connect its drain passage to the servomotor and to disconnect its pressure passage from the pressure passage of the first control valve, said selective connections of the second control valve being effected by movement of the second control valve into a first position and a second position, respectively, and means for feathering the propeller including selectively operable actuating means engageable with said second control valve to shift the same into said second position.

13. An hydraulic servo system for controlling the pitch of an aeronautical propeller comprising in combination, a source of hydraulic pressure, a drain, a reversible servomotor adapted to effect pitch change toward low pitch when connected with the source and toward high pitch when connected wtih the drain, a first control valve responsive to propeller speed and connected to the servomotor and having a pressure passage and a drain passage, a second control valve responsive to propeller speed and connected to the servomotor and having a pressure passage connected between the source and the pressure passage of the first control valve and also a drain passage connected between the drain and the drain passage of said first control valve, said second control valve being positioned at one propeller speed to connect its pressure passage to the servomotor and to disconnect its drain passage from the drain passage of the first control valve and being positioned at a greater propeller speed to connect its drain passage to the servomotor and to disconnect its pressure passage from the pressure passage of the first control valve, and means for feathering the propeller including selectively operable actuating means engageable with said second pilot valve to shift to and maintain the same in its position corresponding to said greater propeller speed, said actuating means including a valve adapted to disconnect said source and said second control valve when said second control valve is engaged by said actuating means.

14. An hydraulic servo system for controlling the pitch of an aeronautical propeller comprising in combination, a source of hydraulic pressure, a drain, a reversible servomotor adapted to effect pitch change toward low pitch when connected with the source and toward high pitch when connected with the drain, an electrically operated first control valve responsive to propeller speed and connected to the servomotor and having a pressure passage and a drain passage which are selectively connected to the servomotor at one propeller speed and at a lesser propeller speed, respectively, a mechanically operated second control valve responsive to propeller speed and connected to the servomotor and having a pressure passage connected between said source and the pressure passage of said first control valve and also having a drain passage connected between said drain and the drain passage of said first control valve, said second control valve being adapted at one propeller speed to connect its pressure passage to the servomotor and at a lesser propeller speed to connect its drain passage to the servomotor, and means for reversing the pitch of the propeller including an electrically operated reversing valve, and means actuated by said reversing valve to engage said second control valve and prevent the same from connecting either its pressure passage or its drain passage to the servomotor.

References Cited in the file of this patent

UNITED STATES PATENTS

| 913,853 | Roundtree | Mar. 2, 1909 |
| 2,067,492 | Kingsbury | Jan. 12, 1937 |
| 2,264,089 | Martin | Nov. 25, 1941 |
| 2,391,629 | Keller | Dec. 25, 1945 |
| 2,556,719 | Cushman | June 12, 1951 |
| 2,666,490 | Richmond | Jan. 19, 1954 |
| 2,737,253 | Moore et al. | Mar. 6, 1956 |
| 2,761,518 | Treseder et al. | Sept. 4, 1956 |

FOREIGN PATENTS

| 198,571 | Germany | May 30, 1906 |
| 238,393 | Switzerland | Nov. 1, 1945 |
| 948,925 | France | Feb. 7, 1949 |